United States Patent
Bhargava et al.

(10) Patent No.: US 12,037,470 B1
(45) Date of Patent: Jul. 16, 2024

(54) POLYMER COMPOSITIONS CONTAINING VOLATILE FUNCTIONAL AGENTS AND METHODS OF MAKING SAME

(71) Applicant: Alltrista Plastics LLC, Greer, SC (US)

(72) Inventors: Saumitra Bhargava, Clarksville, MD (US); Marty Schillinger, Simpsonville, SC (US)

(73) Assignee: ALLTRISTA PLASTICS LLC, Greer, SC (US)

( * ) Notice: Subject to any disclaimer, the term of this patent is extended or adjusted under 35 U.S.C. 154(b) by 499 days.

(21) Appl. No.: 17/468,503

(22) Filed: Sep. 7, 2021

Related U.S. Application Data (60) Provisional application No. 63/074,511, filed on Sep. 4, 2020.

(51) Int. Cl.
  *C08J 3/22* (2006.01)
  *B29C 48/00* (2019.01)
  *B29C 48/40* (2019.01)
  *B29K 23/00* (2006.01)

(52) U.S. Cl.
  CPC ............ *C08J 3/226* (2013.01); *B29C 48/023* (2019.02); *B29C 48/40* (2019.02); *B29K 2023/065* (2013.01)

(58) Field of Classification Search
  CPC ........ C08J 3/226; B29C 48/023; B29C 48/40; B29K 2023/065
  See application file for complete search history.

(56) References Cited

U.S. PATENT DOCUMENTS

| | | | |
|---|---|---|---|
| 6,010,723 A * | 1/2000 | Song | A23G 4/02 426/516 |
| 8,960,422 B2 | 2/2015 | Reyhan et al. | |
| 9,149,273 B2 | 10/2015 | Scalzo et al. | |
| 2010/0163435 A1 | 7/2010 | Fischer et al. | |

* cited by examiner

*Primary Examiner* — Edward J Cain
(74) *Attorney, Agent, or Firm* — Eversheds Sutherland (US) LLP (57) ABSTRACT

Methods of making polymer compositions containing volatile functional agents are provided, along with compositions and articles made from such methods. The methods include mixing one or more volatile functional agents into one or more polymers in a first extruder to form a masterbatch, further mixing the masterbatch in a second extruder having a volume that is larger than a volume of the first extruder, maintaining the mixing temperatures of both the first and second extruders below the volatilization temperature of the one or more volatile functional agents during the first and second mixing steps, and forming the mixture of the one or more volatile functional agents and the one or more polymers into pellets having a substantially uniform distribution of the one or more volatile functional agents in the one or more polymers.

30 Claims, 3 Drawing Sheets

POLYMER COMPOSITIONS CONTAINING VOLATILE FUNCTIONAL AGENTS AND METHODS OF MAKING SAME

CROSS-REFERENCE TO RELATED APPLICATIONS

This application claims priority to U.S. Provisional Patent Application No. 63/074,511, filed Sep. 4, 2020, which is incorporated by reference herein in its entirety.

BACKGROUND

This disclosure generally relates to polymer manufacturing, and specifically relates to manufacturing polymer compositions and articles containing volatile functional agents.

Polymer compositions that can deliver scent, antimicrobial agents, medication, and surface modifiers, among other materials, may add value to the composition and articles made therefrom. For example, these additives may improve comfort, feel and functionality of compositions and products manufactured therefrom, such as packaging materials for medical, consumer, and food packaging applications.

Polyolefins such as polyethylene and polypropylene are commonly used polymers for manufacturing articles. Having additives present in ppm (part per million) levels in polymer compositions containing these polymers allows one to use existing polymer processing technology without impacting processing, mechanical performance or recyclability of the resulting product.

In certain applications, precision dosing of the additive within a polymer composition and the products made therefrom is critical. For example, articles that deliver or contain medication or other active agents (e.g., antimicrobials) must be consistently formulated to contain the additive in an amount within a relatively narrow range. Additionally, the amount of active agent present in compositions for such applications is relatively extremely low, such as from 100-1000 ppm. Such precision dosing at low additive levels presents many challenges. Moreover, when a particular additive has a relatively high vapor pressure, it will volatilize leading to loss during production. As a result, processing compositions containing low levels of that additive is increasingly difficult as the melt temperature of the polymer increases.

Accordingly, there is a need for new technologies and improvements to existing technologies to increase the efficiency and effectiveness of such manufacturing processes for the production of polymer materials containing volatile functional agents.

SUMMARY

In one aspect, methods of making polymer compositions containing volatile functional agents are provided. A method includes, in a first mixing step, mixing one or more volatile functional agents into one or more polymers in a first extruder to produce a masterbatch. The first extruder has a screw element profile selected for low to medium shear while maintaining a substantially filled-flight within the mixing and metering portion of the screw. The first extruder is operated at a pressure of from about 1200 psi to about 4000 psi. In a second mixing step, the masterbatch is further mixed in a second extruder. The second extruder has a volume larger than a volume of the first extruder. A mixing temperature of the first extruder is maintained below a volatilization temperature of the one or more volatile functional agents during the first mixing step. After the second mixing step, the mixture of the one or more volatile functional agents and the one or more polymers is formed into pellets having a substantially uniform distribution of the one or more volatile functional agents in the one or more polymers. The one or more volatile functional agents are present in the pellets in an amount of from about 100 to about 4000 ppm (0.01 wt % to 0.4 wt %).

In another aspect, polymer compositions containing volatile functional agents and articles formed therefrom are provided.

BRIEF DESCRIPTION OF THE DRAWINGS

The detailed description is set forth with reference to the drawings, which are meant to be exemplary and not limiting, illustrating examples of the disclosure, in which use of the same reference numerals indicates similar or identical items. Certain embodiments of the present disclosure may include elements, components, and/or configurations other than those illustrated in the drawings, and some of the elements, components, and/or configurations illustrated in the drawings may not be present in certain embodiments.

The particulars shown herein are by way of example and for purposes of illustrative discussion of the various embodiments of the present disclosure only and are presented in the cause of providing what is believed to be the most useful and readily understood description of the principles and conceptual aspects of the disclosure. In this regard, no attempt is made to show details of the disclosure in more detail than is necessary for a fundamental understanding of the disclosure, the description making apparent to those skilled in the art how the several forms of the disclosure may be embodied in practice.

DETAILED DESCRIPTION

The present disclosure will now be described by reference to more detailed embodiments. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

Unless otherwise defined, all technical and scientific terms used herein have the same meaning as commonly understood by one of ordinary skill in the art to which this disclosure belongs. The terminology used in the disclosure herein is for describing particular embodiments only and is not intended to be limiting of the disclosure. As used in the disclosure and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and appended claims are approximations that may vary depending upon the desired properties sought to be obtained by the present disclosure. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

As discussed herein, embodiments of the present disclosure beneficially provide for improved methods of manufacturing polymer compositions containing volatile or active functional agents, such as scents, antimicrobial agents, medication (e.g., active pharmaceutical or therapeutic agents), and surface modifiers. These methods may allow for predictable and precise dosing of such active agents within polymer compositions at relatively low levels, such as from about 100 to about 4000 ppm (0.01% to 0.4 wt %). Moreover, the polymer compositions and articles manufactured from such compositions may have decreased variability in the content of such functional agents, measured relative both to a target dosed content of functional agents (i.e., precision) and to other compositions and articles manufactured from a single process (i.e., accuracy). As used herein, the term "decreased variability" refers to one or both of improved precision or accuracy of the active agent content in the resulting compositions and articles. For example, articles benefiting from this decreased variability may include packaging, such as for medical, consumer, and food packaging applications or medical device.

As used herein, the phrases "functional agent," "active agent," or similar, which are used interchangeably, refer to additives to the polymer composition that impart some desired characteristic, such as a scent, antimicrobial properties, medicinal properties, a particular texture, or another characteristic. A "volatile functional agent" refers to a functional agent that readily vaporizes at room and/or traditional processing temperatures and pressures. Volatile functional agents are characterized by having a relatively high vapor pressure, which causes the agents to flash off at the exit of the extrusion die under typical processing parameters, resulting in significant loss of the functional agent. For example, the volatile functional agent triclosan, which imparts antimicrobial properties to a composition, has a vapor pressure of $3.0 \times 10^{-4}$ Pa at 20° C.

Methods of incorporating a volatile functional agent into moldable, extrudable, or otherwise thermoformable plastic compositions are provided. In certain embodiments, a method includes mixing one or more volatile functional agents into one or more polymers in a first extruder having a screw element profile selected for low to medium shear while maintaining a substantially filled-flight within the mixing and metering portion of the screw in a first mixing step, to form a masterbatch. The mixing temperature of the first extruder is maintained below the volatilization temperature of the one or more volatile functional agents during the first mixing step. The method includes further mixing the one or more volatile functional agents into the one or more polymers (i.e., further mixing the masterbatch) in a second extruder that is larger than the first extruder in a second mixing step. The method also includes forming the mixture of the one or more volatile functional agents and the one or more polymers (i.e., the masterbatch as mixed or modified in the second mixing step) into pellets or another suitable form of moldable, extrudable, or otherwise thermoformable plastic material.

As used herein, a "screw element profile" refers to the shape and dimensions of the screws in the extruder, such as the diameter, pitch, and number of flights. As used herein, "low to medium shear" is used as those terms are regularly used and understood in the industry. More specifically, extruder manufacturers market particular equipment and configurations as having "low shear," "medium shear," or "high shear." For example, the degree of shear in a given piece of equipment is affected by elements such as gear box/comb elements, helical lobal elements, and slotted conveying elements, which may have different names depending on the manufacturer. "Low to medium shear" can be achieved, for example, by slotted conveying elements with 15° to 30° pitch. A 15° slotted conveying element may run substantially filled while exhibiting medium shear. "Low to medium shear" can be achieved, for example, by gear box/comb, or helical lobal elements with 120° pitch when substantially filled. For example, a Leistritz ZSE-18HP 18 mm twin screw compounder (available commercially from Leistritz Corp., Nurnberg, Germany) has "low" shear when using a 40 L/D compounder with helical lobal elements and/or gear box elements with a 120° screw pitch.

As used herein, a "masterbatch" refers to the combination of one or more polymers with one or more volatile functional agents in a preliminary mixing step. The masterbatch may be only partially mixed such that discrete regions having high relative concentrations of the one or more volatile functional agents are present therein, or the masterbatch may be well mixed such that the composition has a homogenous or uniform concentration of the one or more volatile functional agents throughout. In embodiments in which the masterbatch is only partially mixed in the first mixing step, a second mixing step may be used as described herein to homogenize the composition. In certain embodiments, a second mixing step involves introducing additional polymer(s) to the masterbatch, to further dilute the one or more volatile functional agents therein.

As used herein, the "mixing and metering" portion of the screw refers to the zone(s) of the screw at which the mixing and metering of the materials occurs. Extruder screws typically have a feed zone, a mixing zone, a metering zone, and optionally a compression zone depending on the process. The feed zone of an extruder screw is characterized by a low temperature and largest flight size (due to a small screw diameter) so that material fed to the screw settles within the flights before substantial mixing or chemical modification occurs. The compaction or compression zone is characterized by an increased screw diameter that lowers the flight size. The lowered flight size results in increased shear as the material within the flight is forced to mix, which also increases the temperature. The mixing and metering zone has a constant diameter and flight size and is designed primarily to transport the material to the end of the extruder. Thus, the mixing and metering zone(s) includes the zone at the end of the extruder immediately before material is removed from the screw.

As used herein, a "flight" refers to the volume of the cavity defined by a screw (e.g., the space between the blades of a screw in the twin-screw compounder). A "substantially filled-flight" refers to a flight that is at least 70% filled with material (e.g., molten polymer). In some embodiments, the substantially filled-flight is at least 90% filled with material. By comparison, traditional processes may run at from 40-60% full flight volume.

As used herein, the term "pellet" refers to a relatively small mass of material formed by pelletizing processes known in the industry (e.g., strand cutting or hot-face pelletizing processes), and is meant to encompass any known pellet size and shape, including micro-pellets. For example, in certain embodiments, the first extruder is configured to make relatively higher concentration micro-pellets, which are then combined with additional polymer in the second extruder to form an ultra-low concentration mixture.

Beneficially, the methods described herein may result in a resulting mixture or pellet having a substantially uniform distribution of the one or more volatile functional agents in the one or more polymers. As used herein, "a substantially uniform distribution" refers to the volatile functional agents being present within the one or more polymers at a variability of less than about 5 percent, such as less than about 3 percent, less than about 1.5 percent, or less than about 1 percent. For example, a continuous thin strip of the product of the second mixing step may be measured at regular intervals for the presence of the volatile functional agent, with the presence of the agent detected at each of the test sites (i.e., intervals) in an amount of at least 95 percent of the average amount, such as at least 97 percent of the average amount.

For example, an injection-molded article produced from the product of the second mixing step may have a measured part variability of less than 5 percent, such as less than 3 percent. For example, a pellet produced by the methods described herein, selected at random, will have the one or more volatile functional agents present in the pellet at a ppm that varies from the ppm of the one or more volatile functional agents in another randomly selected pellet by less than 5% (i.e., accuracy). For example, where the average concentration of the one or more volatile functional agents in a sampling of pellets is 1500 ppm, then the volatile functional agents may be present in the pellets in an amount of 1500 ppm±75 ppm or less.

Additionally, the methods described herein may be performed with a loss of less than 10 percent, by weight, of the one or more volatile functional agents due to volatilization during the first and second mixing steps. For example, the methods may be performed with a loss of less than 3 percent, by weight, of the one or more volatile functional agents due to volatilization during the first and second mixing steps. That is, the described methods may result in substantially no loss of the volatile functional agents to the atmosphere during processing. In certain embodiments, the methods described herein can produce a product from the second mixing step and/or an article formed therefrom that have an average volatile functional agent loss of less than 100 ppm (i.e., less than 0.01%), such as less than 30 ppm (i.e., less than 0.003%).

The volatile functional agent may be any agent having desirable properties and composition for forming the pellets and articles described herein. For example, the volatile functional agents may be scents/fragrances (such as essential oils), antimicrobial agents, therapeutic agents, and/or surface modifiers, among others. For example, the agents may include surfactants such as Triton™ X-100, which is a non-ionic surfactant (commercially available from Dow Chemical Company, USA), and/or Exxal™ 13/8EO, which is a non-ionic surfactant (commercially available from Exxon Mobil Corporation, USA). Suitable antimicrobial agents may be selected from, but are not limited to, halogenated hydroxyl ethers, acyloxydiphenyl ethers, or combinations thereof. In certain embodiments, the volatile functional agent is an antimicrobial agent containing 2,4,4'-trichloro-2'-hydroxydiphenyl ether, commonly referred to as triclosan (manufactured by BASF SE, Germany, under the brand name IRGASAN® DP300 or IRGACARE® MP).

Triclosan is a broad-spectrum antimicrobial agent that is effective against a number of organisms such as *Staphylococcus*, *Staphylococcus epidermidis*, *Staphylococcus aureus*, methicillin-resistant *Staphylococcus epidermidis*, methicillin-resistant and *Staphylococcus aureus*, for example.

The one or more polymers may be selected from moldable polymer materials known in the industry. For example, the polymers may be selected from polyolefin and other thermoplastic materials. In certain embodiments, the one or more polymers are selected from polyethylene, such as high-density polyethylene (HDPE), low-density polyethylene (LDPE), linear low-density polyethylene (LLDPE), polyethylene copolymers, polypropylene copolymers, and/or ethylene copolymers.

In certain embodiments, the first mixing step forms a masterbatch with volatile agent loading between about 1 wt % to about 10 wt % (i.e., 10,000 ppm to 100,000 ppm). In other words, in certain embodiments, this first mixing step mixes active agent with virgin polymer in a ratio of between 1:100 to 1:10. In certain embodiments, the second mixing step involves mixing a product of the first mixing step (i.e., the masterbatch) with an additional amount of the one or more polymers. For example, in such embodiments, the product of the first mixing step may contain the one or more volatile functional agents present in an amount of from about 10,000 to about 100,000 ppm. In certain embodiments, the product of the first mixing step is combined with the additional amount of the one or more polymers in a in a ratio of between 1:100 to 1:10 (i.e., up to 10 wt %). In certain embodiments, the product of the second mixing step may contain the one or more volatile functional agents present in an amount of from about 100 ppm to about 10,000 ppm, such as from about 100 ppm to about 4000 ppm, or about 200 ppm to about 1500 ppm. In certain embodiments, the second mixing step may involve introducing no additional volatile functional agent to the mixture.

In certain embodiments, the pellets or other resulting article or material contain the one or more volatile functional agents in an amount of from about 100 to about 4000 ppm (0.01% to 0.4 wt %), such as from about 200 to about 1500 ppm. For example, the pellets or other resulting article or material may contain from about 350 to about 450 ppm. As discussed herein, beneficially, the variability of the amount of volatile agent in the final composition may represent a significant improvement over known processes for mixtures of volatile agents in polymers. For example, the methods described herein may produce compositions having a variability (i.e., precision to dosed target amount or accuracy) of less than about 5 percent, such as less than about 3 percent, or less than 1 percent, as described above.

Figure 2:
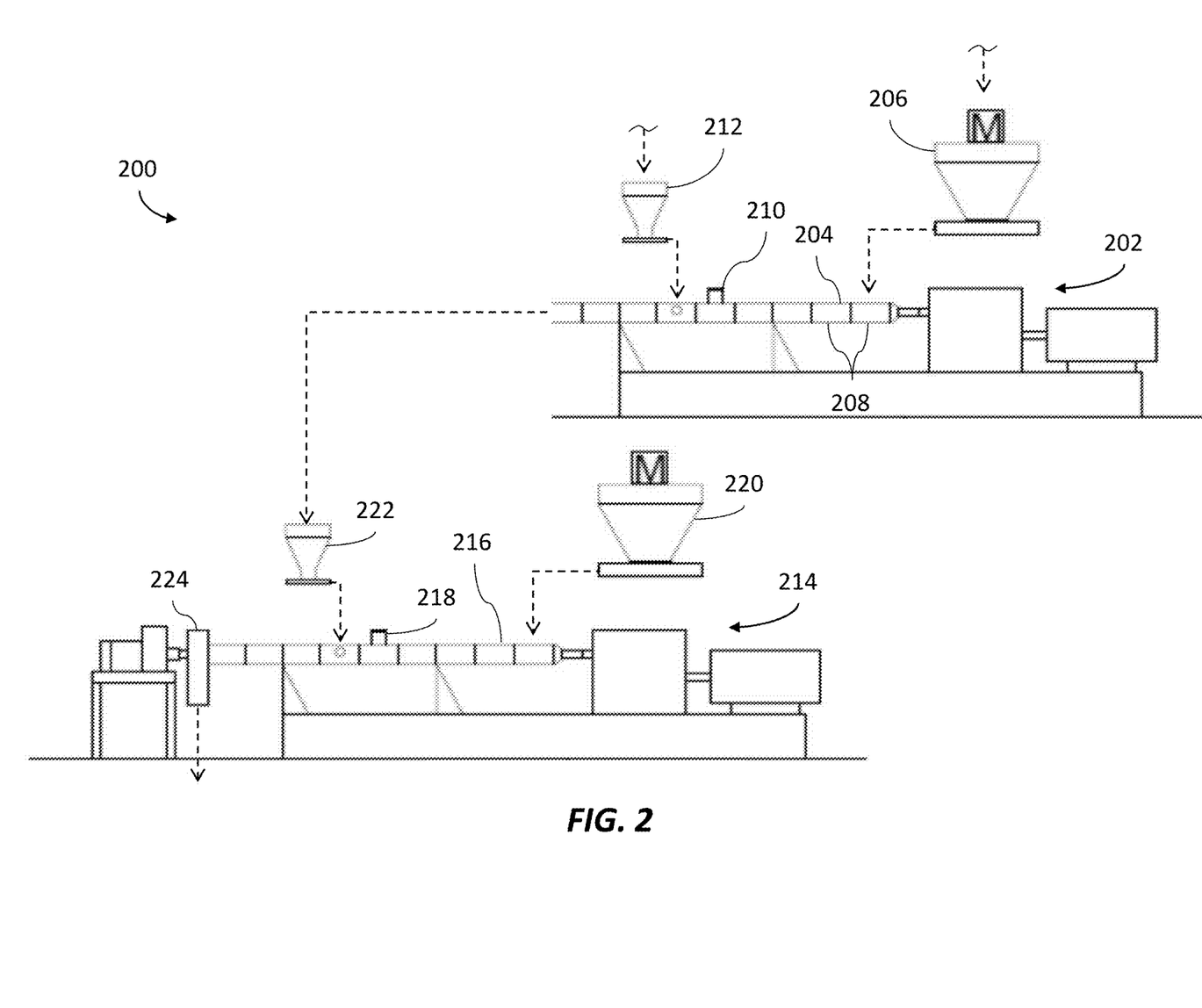
FIG. 2 illustrates an embodiment of a hot face pelletizing line having two extruders, in accordance with the present disclosure.

Any suitable extruders may be employed with the methods described herein. In certain embodiments, as shown in FIG. 2, the first and second extruders are each twin screw extruders.

In certain embodiments, these methods also include, after the first mixing step, forming the mixture of the one or more volatile functional agents and the one or more polymers into intermediate pellets (e.g., micro-pellets), wherein the intermediate pellets are provided to the second extruder in the second mixing step. That is, intermediate pellets may be formed from the product of the first mixing step and then fed into the second mixing step. The intermediate pellets may be formed on any suitable pelletizing equipment, such as a hot face pelletizer, as shown in FIG. 1.

Figure 3:
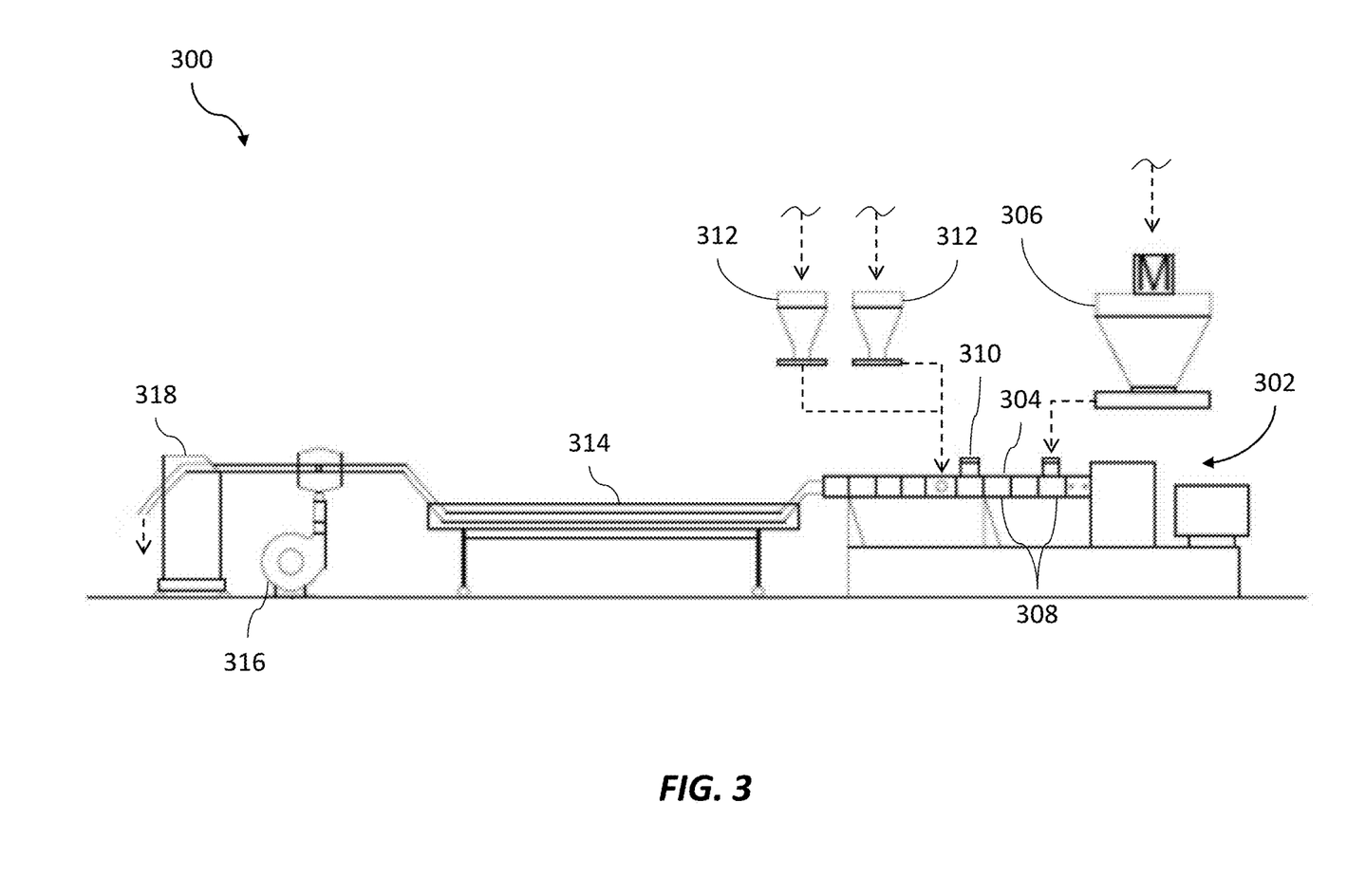
FIG. 3 illustrates an embodiment of a strand pelletizing line, in accordance with the present disclosure.

Likewise, pelletizing the product of the second mixing step may be performed using any suitable pelletizing equipment, such as a strand pelletizer, as shown in FIG. 3. For example, the strands of the mixture resulting from the second mixing step may be cast on a belt, such as a silicone belt, and at least partially cooled, prior to being formed into the pellets.

Figure 1:
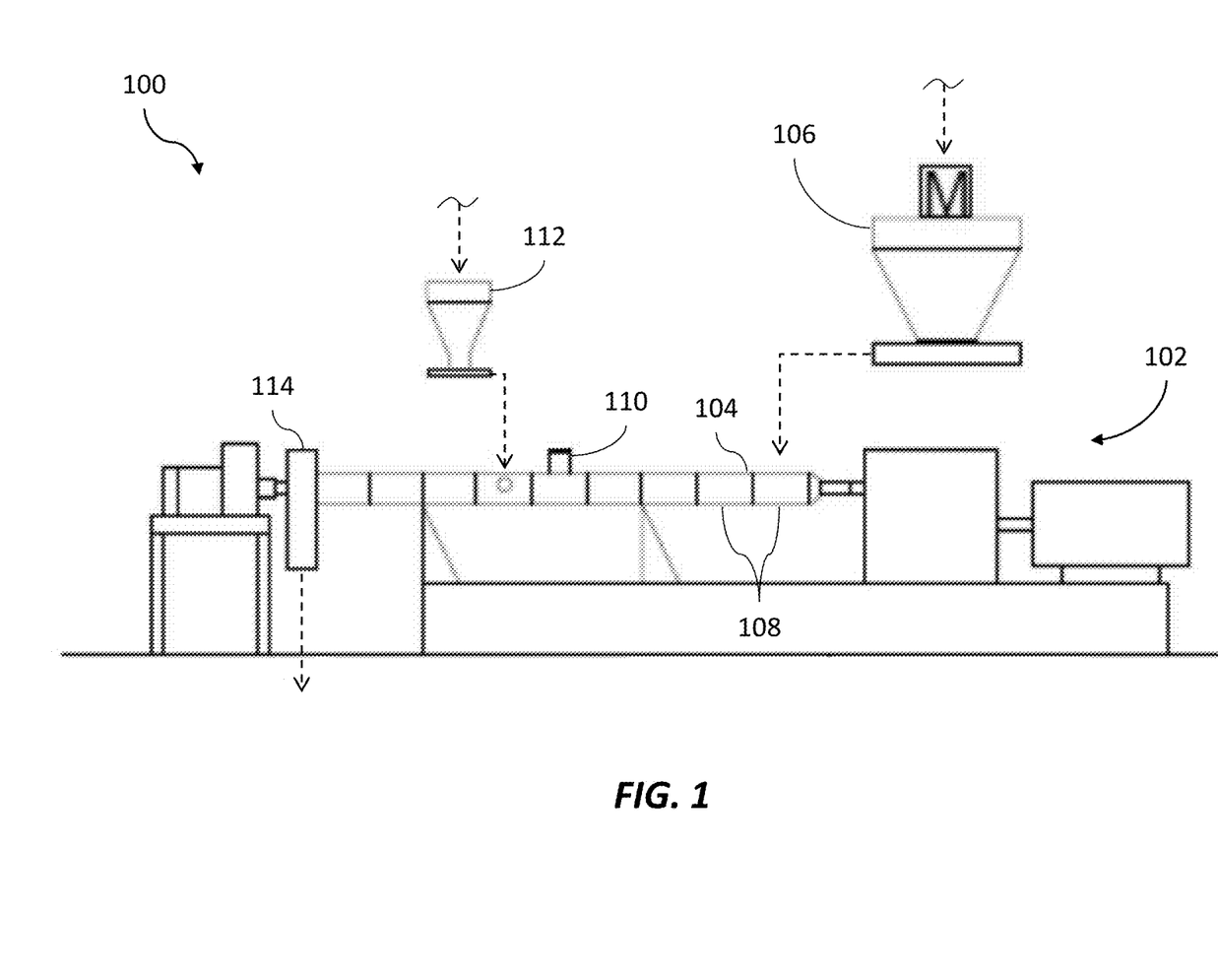
FIG. 1 illustrates an embodiment of a hot face pelletizing line, in accordance with the present disclosure.

In certain embodiments, as shown in FIGS. 1 and 3, the first and second mixing steps are performed off line from one another. In other embodiments, as shown in FIG. 2, the first and second mixing steps are performed in line with one another.

The processing parameters and screw element profile for the extruders have been found to be important to achieving the desired ultra-low dosing of the volatile agents. For example, the first extruder may have a screw element profile selected for low to medium shear while maintaining a substantially filled-flight within the mixing and metering portion of the screw. For example, the pressure of the first extruder may be from about 1,200 to about 6,000 psi, such as about 1,200 to about 4,000 psi, or about 2,000 to about 4,000 psi. That is, the pressure of the extruder may be increased before the mixture exits the die, to further reduce loss of the volatile agent.

Controlling the diameter and dimensions of intermediate pellets (i.e., the pellets formed from the output of the first extruder (masterbatch)) has been found to be important to controlling uniformity of the resulting extruded strand. To this end, the strand diameter may be continuously monitored by strand monitoring equipment, such as the ZUMBACH model ODAC® 60J (Zumbach Electronic AG, Switzerland). The cutter speed may be adjusted to obtain intermediate pellets with a length:diameter ratio of about 1. Controlling both the strand dimensions and cutting speed was found to result in the further reduction of long-end variability by 25% for the compounded strand produced by the larger compounder.

In certain embodiments, as shown in FIG. 1, the one or more polymers are fed to the first extruder through a main feeder and the functional agent is introduced via a side feeder. The polymer may be vented, as discussed herein, prior to introduction of the functional agent. As discussed, it has been observed that low or medium shear elements produce a more uniform melt in this system. Moreover, the elements may be selected to allow the flights to remain full during processing.

As described herein, the "mixing" temperature of the first and/or second extruders refers to the temperature of the mixing and metering elements of the extruders (i.e., the zones of the extruder responsible for mixing the one or more volatile functional agents into the polymer), and may be maintained below the volatilization temperature(s) of the one or more volatile functional agents during the first and second mixing steps. The "melt" temperature of the first and/or second extruders refers to the final zone in each extruder, immediately before pelletization. In certain embodiments, the melt temperature in the first extruder is up to 123° C., such as from 108° C. to 123° C., once the pressure has been increased. In certain embodiments, the melt temperature in the second extruder is up to 134° C., such as from 128° C. to 134° C. For example, triclosan typically has a melting point of 55°–57° C. (131°–135° F.) and a boiling point of 120° C. (248° F.).

In certain embodiments, the mixing steps are performed without the introduction of a solvent to the mixture during the first and second mixing steps, which may beneficially avoid the introduction of further additives into the mixture and decrease product variability. In some embodiments, the method also includes venting the one or more polymers to substantially eliminate any volatile degradation products from the one or more polymers prior to the first mixing step, which may beneficially decrease product variability and minimize loss of the volatile agents. For example, such venting may include passive venting or vacuuming the base polymer resin after it is subjected to melting in the main feeder. In certain embodiments, the method is conducted without exposing the mixture and pellets formed therefrom to cooling water, which may further reduce the exposure of the mixture to unwanted impurities and improve the consistency of the product by limiting loss of the functional agent to the water.

Use of the first and second extruders as described herein may beneficially allow the resulting pellets or materials to have a low variability at a relatively low volatile agent load rate. That is, the described methods allow for a higher load rate of the volatile agents in the polymers (e.g., concentrated mixture, masterbatch) to be prepared in the first extruder, with a decreased concentration of the volatile agent in the mixture to be achieved in the second extruder.

Further, the presently described methods beneficially allow for the elimination of many or all of the traditional processing additives that are necessary in traditional mixing processes. For example, the present methods may eliminate the need for additives other than the functional agents and reduce or eliminate sources of contamination and impurities.

Importantly, the methods described herein may provide for the use of known polymer processing equipment, such as the specific extruders and pelletizing equipment described herein, without affecting processing, mechanical performance or recyclability of the resulting product. For example, incorporating volatile functional agents into moldable plastic while minimizing loss during compounding and injection molding is difficult using existing processes. Ingredients that are active agents for these purposes are typically expensive, and accordingly, the loss of these ingredients during processing can represent a large expense. In addition, being able to control and maintain a consistent dosing level represents a significant improvement over known processes. For example, the ability to generate this type of control helps maintain uniformity of performance of the product or article in use, which represents another significant advantage.

In certain embodiments, the methods further include forming the pellets into a useful article, such as by molding (such as injection molding), thermoforming, or extruding. That is, the pellets or other material form of the resulting composition from the process may be introduced into the desired molding or forming process. The article may be any desired article formed by such processes. In particular, the article may be a packaging article (e.g., package for goods such as for medical, consumer, and food packaging applications) or a component of a packaging article. In certain embodiments, the packaging article is a container, a component of a container, a film, sheet, or label. Beneficially, articles made by the described methods may be configured to release the volatile functional agent according to a desired release profile.

It has also been found that the one or more volatile functional agents present in the pellets, material, or article formed therefrom may be measured by subjecting the article to X-ray fluorescence (XRF) spectroscopy, inductively coupled plasma mass spectrometry (ICP, ICP-MS), nuclear magnetic resonance (NMR), or another quantitative technique for additives containing non-carbon, oxygen elements. For example, the amount of functional agent present in a solid polymer composition or article may be determined by subjecting the article to X-ray fluorescence spectroscopy.

FIG. 1 illustrates an embodiment of a hot face pelletizing line 100 having an extruder 102. For example, extruder 102 may be suitable for performing the first or second mixing steps described herein. Extruder 102 includes twin-screw compounder 104 supplied by a main feeder 106, with the flow of material illustrated by dashed arrows. Compounder 104 includes a plurality of zones 108, each of which may be individually configured by temperature, or as inlets or outlets. FIG. 1 illustrates the supply of material from main feeder 106 to the first zone 108. Compounder 104 includes a vent 110 configured to remove degradation product that may be present before the introduction of the volatile functional agent. In some embodiments, side feeder 112 supplies the volatile functional agent to the compounder 104, where it is mixed with the feed from the main feeder 106 to produce a masterbatch. In other embodiments, side feeder 112 supplies the masterbatch from a prior extruder to the extruder 102, while the main feeder 106 optionally may be used to introduce additional polymer to the composition. The output of the extruder 102 is then introduced to the hot face pelletizer 114, which includes a die and a cutter. The resulting pellets are then discharged from the line 100. In some embodiments, the pellets are further processed in a second extruder, such as to introduce more functional volatile agent. In other embodiments, the pellets that are produced are suitable for manufacture into an end-consumer product.

FIG. 2 illustrates an embodiment of a hot face pelletizing line 200 having two extruders in-line with one another. First extruder 202 includes a first twin-screw compounder 204 supplied by a main feeder 206, with the flow of material illustrated by dashed arrows. First compounder 204 includes a plurality of zones 208, each of which may be individually configured by temperature, or as inlets or outlets. FIG. 2 illustrates the supply of material from main feeder 206 to the first zone 208. First compounder 204 includes a first vent 210 configured to remove degradation product that may be present before the introduction of the volatile functional agent. First side feeder 212 supplies the volatile functional agent to the first compounder 204, where it is mixed with the feed from the main feeder 206 to produce a masterbatch.

Masterbatch from the first compounder 204 is then directly supplied to a second extruder 214 having a second twin-screw compounder 216, second vent 218, second main feeder 220, and second side feeder 222. Second main feeder 220 may optionally introduce additional polymer depending on the desired chemistry. The masterbatch may be supplied to the second extruder 214 from the first extruder 202 according to the dashed arrows. In some embodiments, both additional volatile functional agent and additional polymer are added in the second extruder. The masterbatch, as mixed and optionally modified to contain further polymer in the second extruder 214, is then introduced to the hot face pelletizer 224, which includes a die and a cutter. The resulting pellets are then discharged from the line 200. Although the first and second compounders are depicted in FIG. 2 as having vents, side feeders, and a plurality of zones, it is to be understood that the modularity of twin-screw compounders permit the addition or removal of vents, feeders, and zones, and further permits the repositioning of the various elements of the extruder and/or compounder. The decision to depict the specific configuration illustrated in FIG. 2 is in the interest of brevity and a number of different configurations may be implemented to practice the methods described herein.

Beneficially, the process illustrated in FIG. 2 avoids remelting the masterbatch material and avoids a pelletization step between the extruders.

FIG. 3 illustrates an embodiment of a strand pelletizing line 300 having an extruder 302. For example, extruder 302 may be suitable for performing the first or second mixing steps described herein. Extruder 302 includes twin-screw compounder 304 supplied by a main feeder 306, with the flow of material illustrated by dashed arrows. Compounder 304 includes a plurality of zones 308, each of which may be individually configured by temperature, or as inlets or outlets. FIG. 3 illustrates the supply of material from main feeder 306 to the first zone 308. Compounder 304 includes a vent 310 configured to remove degradation product that may be present before the introduction of the volatile functional agent. In some embodiments, side feeder(s) 312 supply the volatile functional agents to the compounder 304, where they are mixed with the feed from the main feeder 306 to produce a masterbatch. In other embodiments, the side feeder(s) may supply the masterbatch from a previous extruder to the extruder 302, while the main feeder 306 optionally may be used to introduce additional polymer to the composition. The output of extruder 302 is supplied to cooling belt 314, where it solidifies to an extrudate. The extrudate passes through an air knife 316 and then pelletizer 318. A second extruder may be provided before or after the cooling belt.

EXAMPLES

Example 1: Manufacture of Polymer Composition

Embodiments of the methods described herein were performed. Surprisingly, it was observed that only a small fraction of the active agent was lost during processing, for example, in compounding and molding, as compared to what has been experienced in the past using traditional processes. The processing was modified to attain temperatures as cool as possible, while still achieving a uniform distribution of functional agent in the resulting polymer. Moreover, it was discovered that this process beneficially may be performed without the addition of solvents, such as water, ethyl alcohol, or ethyl acetate (other than solvents in which the active agents are provided, if any), to accomplish a uniform distribution, which further reduces the need for solvent evaporation as part of the process, which can result in the loss of even more of the volatile antimicrobial agent.

As described, processing temperatures were reduced by as much as 50° C. or more, which was found to have a significant effect on reducing the loss of the volatile agents. Further, while the active agent can be added to the polymer in solution form, uniform distribution of the agent in the polymer was surprisingly accomplished without the addition or need for such solvents. For example, the agent was found to be able to be added directly to the polymer, for example, molten polyethylene, in powder form. The screw profiles of the compounders were adjusted to make such compounding active and uniform, again, without the need for solvents. The temperatures were controlled in sectioned screw compounders to accomplish uniform mixing at temperatures, which was found to substantially reduce the volatile release of the agents. This was accomplished by controlling both temperature and shear in the compounder.

Specifically, in a smaller twin screw extruder, the initial concentrate of polymer and agent were compounded, followed by increased mixing in a larger twin screw compounder, as shown in FIG. 2. By using a two-step method and controlling the temperatures and shear, volatilization of the agent was found to be substantially eliminated. Since the smaller twin screw extruder has a larger surface area as compared to the polymer, the heat dissipates more quickly, resulting in the lower temperatures. With the lower temperature two-step process, super fine micro-pellets were able to be formed, which were then be fed into other molding and forming equipment.

The resulting process resulted in virtually no emissions and substantially no loss of volatile agent, in addition to providing the ability to consistently control the amount of agent in the polymer, with a consistently uniform distribution of the agent in the polymer. It was found that the agent is able to be controlled to be present in the polymer in amounts of from about 200 ppm to about 1500 ppm, for example, 400 ppm, +/−50 ppm.

As a comparison, a compound of triclosan in HDPE was prepared under standard conditions in a twin screw extruder using a traditional solvent addition process, which was found to result in more than 55% of triclosan loss at the compounder. Next, a lower temperature was attempted in the referenced process, with 129° C. polymer melt temperature achieved; however, this process still resulted in over 50-55% loss in triclosan level versus the dosed level.

Next, a high concentration polyethylene masterbatch was produced on a small twin screw extruder at a low temperature (128-129° C.), with an HDPE feed rate 5 lbs/hr and neat triclosan provided at 52.6 g/hr. Next, this masterbatch was mixed with additional HDPE resin using a larger compounder. Overall loss was measured between 3-5%, which was a significant improvement over comparative traditional processes. Further, uniform distribution of triclosan was measured across the resulting flakes.

Additionally, it was found important to be able to accurately measure the amount of functional agent present in the articles formed after extruding, molding, etc., since as indicated above, a problem with traditional methods of manufacturing such compositions related to loss of agent during processing and forming of the article. Traditional measurement methods either require destruction of the article or lack the accuracy desired when measuring such low amounts of active agent.

X-ray fluorescence (XRF) is a non-destructive analytical technique used to determine the elemental composition of materials. It was discovered that commercially available XRF analyzers can be used to determine the chemistry of a sample by measuring the fluorescent (or secondary) X-ray emitted from a sample when it is excited by a primary X-ray source. For the methods described herein, this measurement process was discovered to have exceptional reproducibility.

In particular, the XRF instrument results coupled with software were utilized to obtain quantitative values on thin and non-uniform part dimensions. The non-uniformity of part dimensions can be dealt with by using software such as employed by Shimadzu's EDX-7000 (Shimadzu Corporation, Japan). For example, as with Spectro Xepos XRF equipment (SPECTRO, Germany), the software processes the information by establishing calibration curves based on controls produced from the non-uniform parts being measured. In the measurement process described herein, measurements were taken using XRF for online measurement at compounder (extruder) and injection molding machines. For example, hand held equipment, such as Thermo Fisher Scientific's Niton XRF (Thermo Fisher Scientific, USA), was set up with trigger software in conjunction with a robotic arm to measure chlorine level in parts in real time. Further, the same equipment was setup to monitor chlorine level in chopped pellets at the extruder.

This testing indicated agreement between the traditional chemical analysis and the XRF process, in identifying the amount of functional agent present in the tested articles.

Next, it was discovered that loss of the volatile agent could further be reduced by eliminating the use of cooling water in the process. For example, a strand pelletizer was found to be suitable to produce a number and size of strands capable of being quenched by rapidly. In particular, a small loss at compounder and injection molding machine was found to be easily captured by activated carbon filters and confirmed by air monitoring.

Last, the resulting material was injection molded using a modified hot runner system operating at 470° F. to further minimize the vaporization of the triclosan. Additionally, the mold temperature was maintained at 80° F. Overall, the triclosan loss of the resulting article was between 1-2%. Thus, it was surprisingly found that articles and compositions in which the loss of a volatile agent in a polymer is substantially reduced are achievable through the described processes.

Example 2: Effect of Pressure in First Mixing Step on Loss of Volatile Component A masterbatch was produced as described herein containing HDPE with a targeted loading of 38,000 ppm of triclosan. A Leistritz ZSE-18HP 18 mm twin screw compounder (available commercially from Leistritz Corp., Nurnberg, Germany) having a 40:1 L/D (ratio of screw length:outside diameter) was used. The compounder had ten zones, each with a temperature set-point. The temperature set-point of the ten zones in the twin screw compounder were, from $1^{st}$ to $10^{th}$, (180/180/70/120/120/115/115/115/125/125°) C. A micropelletizer die is positioned after the $10^{th}$ zone.

Two micropelletizer dies were analyzed, one with 8 capillaries×1 mm diameter and another with 10 capillaries× 1.5 mm diameter. Triclosan was introduced using a Leistritz LSB-17 side stuffer in the $6^{th}$ zone, while vacuum was applied to vent the system in the 4th zone. Following the introduction of triclosan, the twin-screw compounder was configured with the following Leistritz screw geometries: conveying element GFA-2-15, conveying element GFA-2-15, gear box GL Forward RH, conveying element GFA-2-15, gear box GL forward RH, and gear box GL Forward RH. The GFA-2-15 conveying elements are low pitch (15°) conveying elements having medium shear and at least 70% of the flight volume filled.

The vacuum vent in the $4^{th}$ zone removes some HDPE degradation product that naturally forms from the heating, melting, and working of the HDPE material. Without intending to be bound by any particular theory, it is believed that venting the HDPE degradation product before introducing triclosan reduces variability and increases reproducibility of results. The compounder was rotated at 150 rpm for both micropelletizer dies.

The pressure of the melt immediately before passing through the die was measured. This pressure is influenced by the number of capillaries, temperature, and the final two zones of the twin screw compounder (which in this example include comb portions). For the first micropelletizer die having 8 capillaries×1 mm diameter, the melt pressure was 1800-2200 psi at a temperature of 123° C. The concentration of triclosan was measured using XRF, as described in Example 1. The concentration of triclosan in the resulting masterbatch across three trials was 37,540 ppm, 37,510 ppm, and 37,580 ppm, representing a loss of less than 1.5% from the loading level of 38,000 ppm triclosan.

For the second micropelletizer die having 10 capillaries× 1.5 mm diameter, the melt pressure was 800 psi and the melt temperature was 123° C. The concentration of triclosan in the resulting masterbatch across three trials was 30,640 ppm, 29,960 ppm, and 30,210 ppm, representing a loss of around 20% from the loading level of 38,000 ppm triclosan. This illustrates that higher pressures before the die can significantly reduce the loss of volatile component after compounding.

Example 3: Effect of Load Level in First Mixing Step on Loss of Volatile Component The experimental setup from Example 2 was repeated, using a Leistritz ZSE-27 27 mm twin screw compounder (available commercially from Leistritz Corp., Nurnberg, Germany) having a 40:1 L/D (ratio of screw length:outside diameter), with no vacuum venting. Four triclosan load levels were sampled: 400 ppm, 800 ppm, 1200 ppm, and 1600 ppm. The micropelletizer die had 8 capillaries×2 mm diameter. The melt temperature before the die was about 125° C., and the melt pressure before the die was 1200 psi. The temperature set-point of the ten zones in the twin screw compounder were, from $1^{st}$ to $10^{th}$ (180/180/130/120/120/ 125/125/125/125/130°) C. Each of the four load levels were trialed three times. The results are displayed in Table 1.

TABLE 1

Effect of triclosan load level on percentage loss of volatile component

| Initial triclosan load concentration (ppm) | Triclosan concentration after compounding (ppm) | Amount loss of triclosan (ppm) | Percentage loss of triclosan |
|---|---|---|---|
| 400 | 385 | 15 | 3.75% |
| 800 | 780 | 20 | 2.50% |
| 1200 | 1173 | 27 | 2.25% |
| 1600 | 1571 | 29 | 1.81% |

As shown in Table 1, a higher initial load of triclosan resulted in a reduced percentage loss of triclosan after compounding. In every trial, the amount of triclosan lost was less than 30 ppm.

Example 4: Triclosan Loss in Conventional Process

A standard compounding process was performed using HDPE in a Theysohn 27 mm twin screw extruder (available commercially from Theysohn Extrusionstechnik GmbH, Salzgitter, Germany) having a 36:1 L/D. The compounder had a 27 mm mixing screw and nine zones, each with a temperature set-point. The temperature set-point of the ten zones in this compounder were, from $1^{st}$ to $9^{th}$, (180/180/ 165/160/150/165/165/160/160) ° C. Triclosan was added via a side stuffer in the $5^{th}$ zone with target loading of 10,000 ppm. The melt temperature was 165° C. and the melt pressure was 800 psi, which are typical parameters for compounding HDPE. The triclosan concentration after compounding was about 5,500 ppm, representing a percentage loss of around 45%.

Thus, it was confirmed that polymer compositions containing a volatile functional agent in extremely low amounts, such as below 6,000 ppm can be reliability manufactured with extremely low variability, as compared to traditional manufacturing processes, without experiencing material fracturing.

While the disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of making a polymer composition containing a volatile functional agent, comprising:
   in a first mixing step, mixing one or more volatile functional agents into one or more polymers in a first extruder to produce a masterbatch, wherein the first extruder has a screw element profile selected for low to medium shear while maintaining a substantially filled-flight within the mixing and metering portion of the screw, wherein the first extruder is operated at a pressure of from about 1200 psi to about 4000 psi,
   in a second mixing step, further mixing the masterbatch in a second extruder that has a volume larger than a volume of the first extruder,
   maintaining a mixing temperature of the first extruder below a volatilization temperature of the one or more volatile functional agents during the first mixing step; and
   after the second mixing step, forming the mixture of the one or more volatile functional agents and the one or more polymers into pellets having a substantially uniform distribution of the one or more volatile functional agents in the one or more polymers,
   wherein the one or more volatile functional agents are present in the pellets in an amount of from about 100 to about 4000 ppm (0.01 wt % to 0.4 wt %).

2. The method of claim 1, wherein the one or more volatile functional agents are selected from scents, antimicrobial agents, pharmaceutical agents, therapeutic agents, and surface modifiers.

3. The method of claim 1, wherein the method is performed with a loss of less than 10 percent, by weight, of the one or more volatile functional agents due to volatilization during the first and second mixing steps.

4. The method of claim 1, wherein the method is performed with a loss of less than 3 percent, by weight, of the one or more volatile functional agents due to volatilization during the first and second mixing steps.

5. The method of claim 1, wherein the mixing steps are performed without the introduction of a solvent to the mixture during the first and second mixing steps.

6. The method of claim 1, wherein the one or more volatile functional agents comprise triclosan.

7. The method of claim 1, further comprising:
after the first mixing step, forming the mixture of the one or more volatile functional agents and the one or more polymers into intermediate pellets,
wherein the intermediate pellets are provided to the second extruder in the second mixing step.

8. The method of claim 7, wherein the intermediate pellets are formed on a hot face pelletizer.

9. The method of claim 1, further comprising:
prior to the first mixing step, venting the one or more polymers to substantially eliminate volatile degradation products from the one or more polymers.

10. The method of claim 1, wherein the method is conducted without exposing the mixture and pellets formed therefrom to cooling water.

11. The method of claim 1, wherein forming the mixture of the one or more volatile functional agents and the one or more polymers into pellets is performed on a strand pelletizer.

12. The method of claim 11, wherein strands of the mixture resulting from the second mixing step are cast on a belt prior to being formed into the pellets.

13. The method of claim 1, wherein the first and second mixing steps are performed off line from one another.

14. The method of claim 1, wherein the first and second mixing steps are performed in line with one another.

15. The method of claim 1, wherein the pellets contain the one or more volatile functional agents in an amount of from about 200 to about 1500 ppm.

16. The method of claim 1, wherein the pellets contain the one or more volatile functional agents in an amount of from about 350 to about 450 ppm.

17. The method of claim 1, wherein the one or more polymers are selected from polyolefin and other thermoplastic materials.

18. The method of claim 1, wherein the one or more polymers are selected from polyethylene and copolymers thereof, and polypropylene copolymers.

19. The method of claim 1, wherein the one or more polymers comprise high-density polyethylene.

20. The method of claim 1, wherein a melt temperature in the first extruder is up to 123° C.

21. The method of claim 1, wherein a melt temperature in the second extruder is up to 134° C.

22. The method of claim 1, wherein the first and second extruders are twin screw extruders.

23. The method of claim 1, wherein the second mixing step further comprises mixing the masterbatch with an additional amount of the one or more polymers.

24. The method of claim 23, wherein the masterbatch is combined with the additional amount of the one or more polymers in an amount of up to 10 percent, by weight, of the one or more polymers.

25. The method of claim 23, wherein the masterbatch comprises the one or more volatile functional agents present in an amount of from about 200 to about 5000 ppm.

26. The method of claim 1, further comprising:
maintaining the mixing temperature of the second extruder below the volatilization temperature of the one or more volatile functional agents during the second mixing step.

27. The method of claim 1, further comprising forming the pellets into an article.

28. The method of claim 27, wherein forming the pellets into an article comprises molding, thermoforming, or extruding the pellets to form the article.

29. The method of claim 27, wherein forming the pellets into the article comprises injection molding the pellets to form the article.

30. The method of claim 27, further comprising measuring the amount of the one or more volatile functional agents present in the article by subjecting the article to X-ray fluorescence spectroscopy.

* * * * *